United States Patent
Wilberforce

(10) Patent No.: US 10,637,286 B2
(45) Date of Patent: Apr. 28, 2020

(54) ENERGY MANAGEMENT SYSTEM

(71) Applicant: SAW Capital Partners LLC, Mars, PA (US)

(72) Inventor: Nana Wilberforce, Mars, PA (US)

(73) Assignee: SAW CAPITAL PARTNERS LLC, Mars, PA (US)

( * ) Notice: Subject to any disclaimer, the term of this patent is extended or adjusted under 35 U.S.C. 154(b) by 154 days.

(21) Appl. No.: 15/968,525

(22) Filed: May 1, 2018

(65) Prior Publication Data

US 2018/0323645 A1    Nov. 8, 2018

Related U.S. Application Data

(60) Provisional application No. 62/500,254, filed on May 2, 2017, provisional application No. 62/637,911, filed on Mar. 2, 2018.

(51) Int. Cl.

| | | |
|---|---|---|
| *H02J 13/00* | (2006.01) | |
| *G05B 13/04* | (2006.01) | |
| *F24F 11/46* | (2018.01) | |
| *F24F 11/58* | (2018.01) | |
| *F24F 11/63* | (2018.01) | |
| *G05B 15/02* | (2006.01) | |
| *G05D 23/19* | (2006.01) | |
| *F24F 130/10* | (2018.01) | |
| *H02J 3/00* | (2006.01) | |
| *F24F 120/10* | (2018.01) | |
| *F24F 120/12* | (2018.01) | |

(52) U.S. Cl.
CPC .......... *H02J 13/0006* (2013.01); *F24F 11/46* (2018.01); *F24F 11/58* (2018.01); *F24F 11/63* (2018.01); *G05B 13/048* (2013.01); *G05B 15/02* (2013.01); *G05D 23/1904* (2013.01); *F24F 2120/10* (2018.01); *F24F 2120/12* (2018.01); *F24F 2130/10* (2018.01); *H02J 3/00* (2013.01); *H02J 2203/20* (2020.01)

(58) Field of Classification Search
CPC .. F24F 11/46; F24F 11/58; F24F 11/63; F24F 2120/10; F24F 2120/12; F24F 2130/10; G05B 13/048; G05B 15/02; G05D 23/1904; H02J 13/0006; H02J 2003/007; H02J 3/00
See application file for complete search history.

(56) References Cited

U.S. PATENT DOCUMENTS 7,965,174 B2    6/2011    Wong et al.
9,418,392 B2    8/2016    Kearns et al.
(Continued)

OTHER PUBLICATIONS

PCT/US2018/030595, ISR and Written Opinion dated Jul. 30, 2018.

*Primary Examiner* — Yuhui R Pan
(74) *Attorney, Agent, or Firm* — Royse Law Firm, PC

(57) ABSTRACT

Smart electricity monitors with unique identities placed at individual power outlets within a building communicate frequent power measurements to a service which determines, from this power usage data, which outlets are associated with occupied seats within the building. This occupancy information can be used to update an occupancy model for the building that is used to forecast the building's occupancy. Based on present occupancy, projected occupancy, and other data, in some instances, the building's thermostats can be controlled and unoccupied seats can be assigned dynamically.

9 Claims, 2 Drawing Sheets

(56) References Cited

U.S. PATENT DOCUMENTS

| | | | |
|---|---|---|---|
| 9,625,518 B2 | 4/2017 | Kabler et al. | |
| 2009/0248704 A1* | 10/2009 | Greenwell | G06Q 10/06 |
| 2012/0066168 A1* | 3/2012 | Fadell | G05B 15/02 |
| | | | 706/52 |
| 2013/0103221 A1* | 4/2013 | Raman | G06F 9/5094 |
| | | | 700/295 |
| 2013/0158721 A1* | 6/2013 | Somasundaram | |
| | | | G05D 23/1917 |
| | | | 700/276 |
| 2013/0238153 A1 | 9/2013 | Byrne | |
| 2013/0285448 A1 | 10/2013 | Yoshinaga | |
| 2013/0297078 A1* | 11/2013 | Kolavennu | G05D 23/1917 |
| | | | 700/276 |
| 2014/0052305 A1* | 2/2014 | Kearns | H02J 3/00 |
| | | | 700/295 |
| 2015/0057820 A1 | 2/2015 | Kefayati et al. | |
| 2015/0088272 A1* | 3/2015 | Drew | H04L 67/10 |
| | | | 700/12 |
| 2016/0164288 A1* | 6/2016 | Yang | H02J 3/14 |
| | | | 307/31 |

* cited by examiner

ENERGY MANAGEMENT SYSTEM

CROSS-REFERENCE TO RELATED APPLICATIONS

This application claims priority to U.S. Provisional Patent Application No. 62/500,254 filed May 2, 2017 and U.S. Provisional Patent Application No. 62/637,911 filed Mar. 2, 2018. The contents of both provisional applications are hereby incorporated herein by reference in their entirety.

BACKGROUND

Field of the Invention

The present disclosure relates to methods and systems for managing building utilities and more particularly to modeling occupancy as it relates to a building's floorplan.

Related Art

Programmable controllers, such as programmable home thermostats, are increasingly being replaced with 'smart' controllers that are Internet-ready and can therefore be adjusted from afar, such as through a smartphone application. Such smart controllers can also be made to respond to inputs from sensors. For example, U.S. Pat. No. 8,510,255 issued in the name of Fadell et al., describes a system "for predicting and/or detecting occupancy of an enclosure, such as a dwelling or other building." In their system, a model of an occupancy pattern is used to seed an occupancy prediction engine. The prediction engine then receives data from various occupancy sensors within the building to predict future occupancy. The prediction can then be used to control heating and cooling, for instance. A wide range of sensors are provided, including acoustic sensors, motion detectors, and cameras. Additionally, network connections such as wifi can be monitored, a radio sensor may be used to monitor changes in low emission radio waves, and "background noise on the main powerline [can be] monitored and filtered to detect the use of electronic devices, which indicates a likelihood of occupancy in the dwelling."

Monitoring the main powerline is taught as employing "smart utility meters, such as Smart Meters, [ ] to monitor energy consumption reflecting the likely presence of occupants" where changes in activity imply changes in occupancy. In the reference, the term "Smart Meter" refers to any advanced utility meter that identifies consumption in greater detail than a conventional utility meter." It should be apparent that monitoring background noise on the main powerline and other references to powerline monitoring in the patent are describing building level monitoring made at the building's utility meter.

SUMMARY

An exemplary method of the present invention optionally comprises configuring a building with a gateway device and smart thermostats and/or smart electricity meters and/or other sensors. Configuring the building in this way can include wirelessly connecting the gateway to the thermostats, electricity meters, and any other sensors, and also can include connecting the gateway to a web server running a cloud-based service.

Further steps of the exemplary method are performed, for example, by the cloud-based service. For example, the method can comprise a step of receiving power usage data from the plurality of electricity monitors within the building, where each electricity monitor includes a unique identifier. Here, the power usage data, as received, is associated with the unique identifiers of the electricity monitors that produced the data. The data can be in watts and reported every two minutes, in some embodiments. In some embodiments, the method additionally comprises receiving and aggregating data from a $3^{rd}$ party source.

In another step of the exemplary method, for each unique identifier, the received power usage data is stored in a database in association with that unique identifier. In a further step, for each unique identifier, a determination is made as to whether the stored power usage data matches a pattern for occupancy. Here, some or all of the stored power usage data for the unique identifier can be compared to various power usage patterns, and if found to match a pattern for occupancy, that is, a pattern of power use that correlates well with use by a person residing in a seat or at a workstation, then the unique identifier can be classified as a seat. In some embodiments, a location of the electricity monitor within the building is stored in the database in association with the unique identifier for that electricity monitor.

In still another step, for each unique identifier classified as a seat, recent data within the stored power usage data is compared to a power usage threshold to determine whether the seat is presently occupied. Here, recent data can simply be the last datum, or power reading, or can be a set of readings over a limited period, such as the last 10 or 20 minutes of readings.

In a further step of the exemplary method, every unique identifier having power usage data matching the pattern for occupancy and having recent data within the power usage data exceeding the power usage threshold is counted in order to determine a number of occupied seats.

In some embodiments, the method further comprises, for each unique identifier, filling in missing values in the power usage data stored in the database. The method can also further comprise revising a power usage threshold for a unique identifier. In still other embodiments the method further comprises adjusting a setting of a thermostat within the building based on a change in the number of occupied seats.

In other embodiments, the method further comprises updating an occupancy model for the building based on a comparison of the occupied seats to seats predicted by the occupancy model. Various methods can further comprise categorizing each seat according to the amount of time that power is used. Still other methods comprise dynamically assigning unoccupied seats.

An exemplary system of the present invention is for use in a building including a number of distributed thermostats. The system comprises a plurality of electricity monitors, each including a unique identifier and each plugged into a different power outlet within the building, each configured to measure power usage and periodically transmit power usage, a gateway in communication with the number of thermostats and the plurality of electricity monitors, a database, and a server, such as a web server, in communication with the gateway and the database. In some embodiments, the electricity monitors communicate with the gateway by Zigbee. The system comprises the number of thermostats, in some embodiments.

The server also includes logic, where the logic is configured to receive, from the plurality of electricity monitors, power usage data associated with the unique identifier for each electricity monitor, determine a change in building occupancy based on the received power usage data, and vary a temperature setting of a thermostat of the number of thermostats based on the change in building occupancy. In various embodiments the logic is further configured to maintain an occupancy model for the building. The logic optionally is further configured to receive a weather forecast and to vary a temperature setting of a thermostat of the number of thermostats based on the weather forecast. In still other embodiments the logic is further configured to receive a report, to use natural language processing to interpret the report, and to vary a temperature setting of a thermostat of the number of thermostats based on an interpretation of the report.

DETAILED DESCRIPTION

The present invention is directed to control systems and methods for use in conjunction with buildings, especially larger facilities including multi-level structures. According to the present invention, a building is equipped with at least a heating system, and preferably both heating and cooling, which is controlled by smart thermostats. The building receives electric power, such as from the public utility grid, and distributes the power throughout the building according to conventional wiring terminating in a plurality of conventional power outlets. Smart electricity monitors placed at these power outlets and then electric devices are plugged into the electricity monitors. Power usage at each monitored power outlet is one of several inputs used to determine proper settings for the smart thermostats. More particularly, power consumption at individual outlets is used to revise a predictive occupancy model, and the model is then used to determine the proper settings. Other systems, such as ventilation systems, home automation systems, enterprise energy management systems, work station plug load management systems, home security, battery charging systems, building monitoring systems, hot water systems, security and emergency response systems, workplace management systems (ordering supplies, arranging workstation assignments, etc.), and lighting systems can be similarly controlled through a predictive model that is revised based on such measures of occupancy. The predictive occupancy model can also find use in contextual models for defining user activities.

Figure 1:
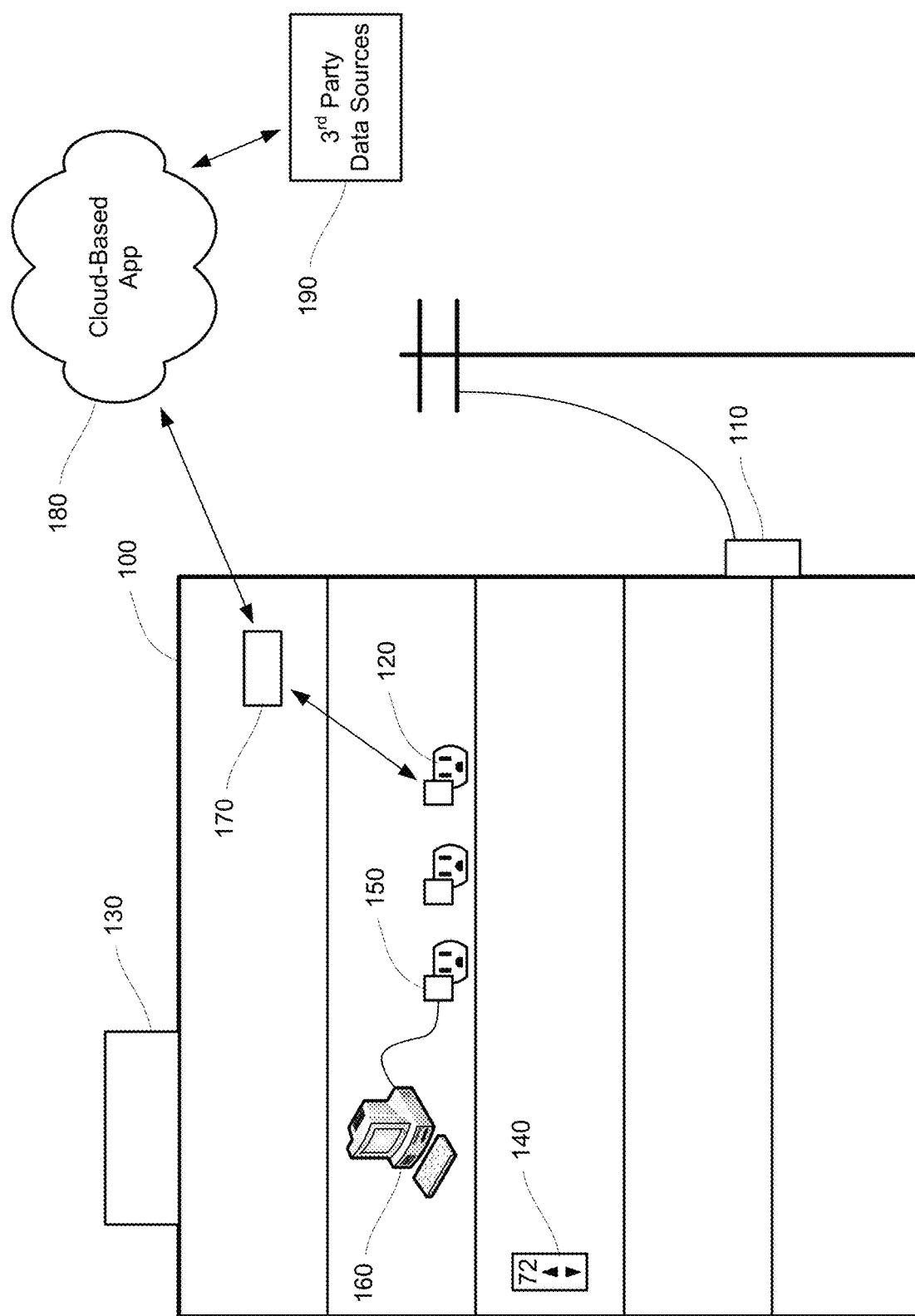
FIG. 1 shows a schematic illustration of a building including a control system according to various embodiments of the present invention.

FIG. 1 shows a schematic illustration of a building 100 including a control system according to various embodiments of the present invention. The building 100 has multiple floors, though the present invention can be applied to single-story structures as well. Power for the building 100 is supplied, in this example, from the public power grid through a utility meter 110 which can be a smart utility meter such as described in U.S. Pat. No. 8,510,255. Electricity is distributed throughout the building 100 according to conventional wiring (not shown) terminating in a plurality of conventional power outlets 120. The building 100 further includes an HVAC system 130 controlled by one or more smart thermostats 140, preferably several on each floor of the building 100. In various embodiments, suitable smart thermostats 140 are devices that are either wirelessly or hard-wired to control the HVAC system 130 and are further enabled to be adjusted wirelessly, such as through an application (app) running on a smart phone or personal computer. Suitable smart thermostats 140 also sense temperature and report the measured temperature wirelessly to the app.

According to various embodiments, systems of the present invention include a plurality of smart electricity monitors 150, one for each power outlet 120, or one for most every power outlet 120, where the electricity monitor 150 plugs into the power outlet 120 and one or more electric devices 160 plug into the electricity monitor 150. While a computer is pictured, other exemplary electric devices 150 include space heaters, refrigerators, coffee makers, phone systems, and so forth. Each electricity monitor 150 stores a unique identifier by which it is identified within networks. In some embodiments, suitable electricity monitors 150 are wireless devices that measure power consumption (in watts, for example) and communicate readings of consumed power when queried, or reports measurements in real-time, or periodically, such as every two minutes. Electricity monitors 150 are Zigbee compliant, in some embodiments.

For simplicity, only temperature monitoring at the sites of the smart thermostats 140 and power consumption monitoring at the sites of the smart electricity monitors 150 have been noted, however, the present invention also can incorporate other sources of sensory data. Examples include radiation monitors on windows, door monitors to indicate when doors are open or closed, additional temperature sensors within the building 100 and/or on the exterior, motion detectors, acoustic detectors, and so forth. These sources of sensory data share in common that they are able to report data wirelessly and digitally.

The various sensors, such as the electricity monitors 150 and thermostats 140, wirelessly communicate with a management gateway device 170 such as through a wifi system (not shown). Management gateway 170 includes an API, such as a service or microservice API, for each type of sensor that it communicates with. It should be noted that in some embodiments the various thermostats 140, monitors 150, and other sensors can be arranged as one or more meshes or neural networks. For instance, all such sensors on each floor can form a mesh, or all such sensors within a portion of the building 100. Thus, meshes can be shared across floors, and each floor can include more than one mesh. Meshes can be organized using the Service Location Protocol (SLP), in some embodiments.

The management gateway 170 also communicates by Ethernet or wifi (not shown), for instance, to a network connection (not shown) like a modem and over a network such as the Internet (not shown) with a cloud-based service 180 running on one or more web servers that makes determinations based on received data in order to, among other things, adjust the temperature settings of the various thermostats 140. In additional to the automated data sources discussed above, the management gateway 170 can also receive, in some embodiments, service requests and work orders (not shown) submitted by people within the building 100 to report facilities problems and to request localized changes in temperature. Natural Language Processing (NLP) can be employed, in some embodiments, to interpret these reports before storing them or otherwise acting upon them. It will be appreciated that in other embodiments the management gateway 170 and cloud-based service 180 can be replaced by a server situated within the building 100 that receives the same data inputs and executes the same routines as the cloud-based service 180.

As shown in FIG. 1, the cloud-based service 180 receives data from sources other than the building 100. Various $3^{rd}$ party data sources 190 can also be utilized by the cloud-based service 180. For example, historical power consumption records can be acquired for the building 100 from the public utility website. Weather data, both current and forecast, for the vicinity of the building 100 can be obtained through public and/or private weather monitoring websites.

Figure 2:
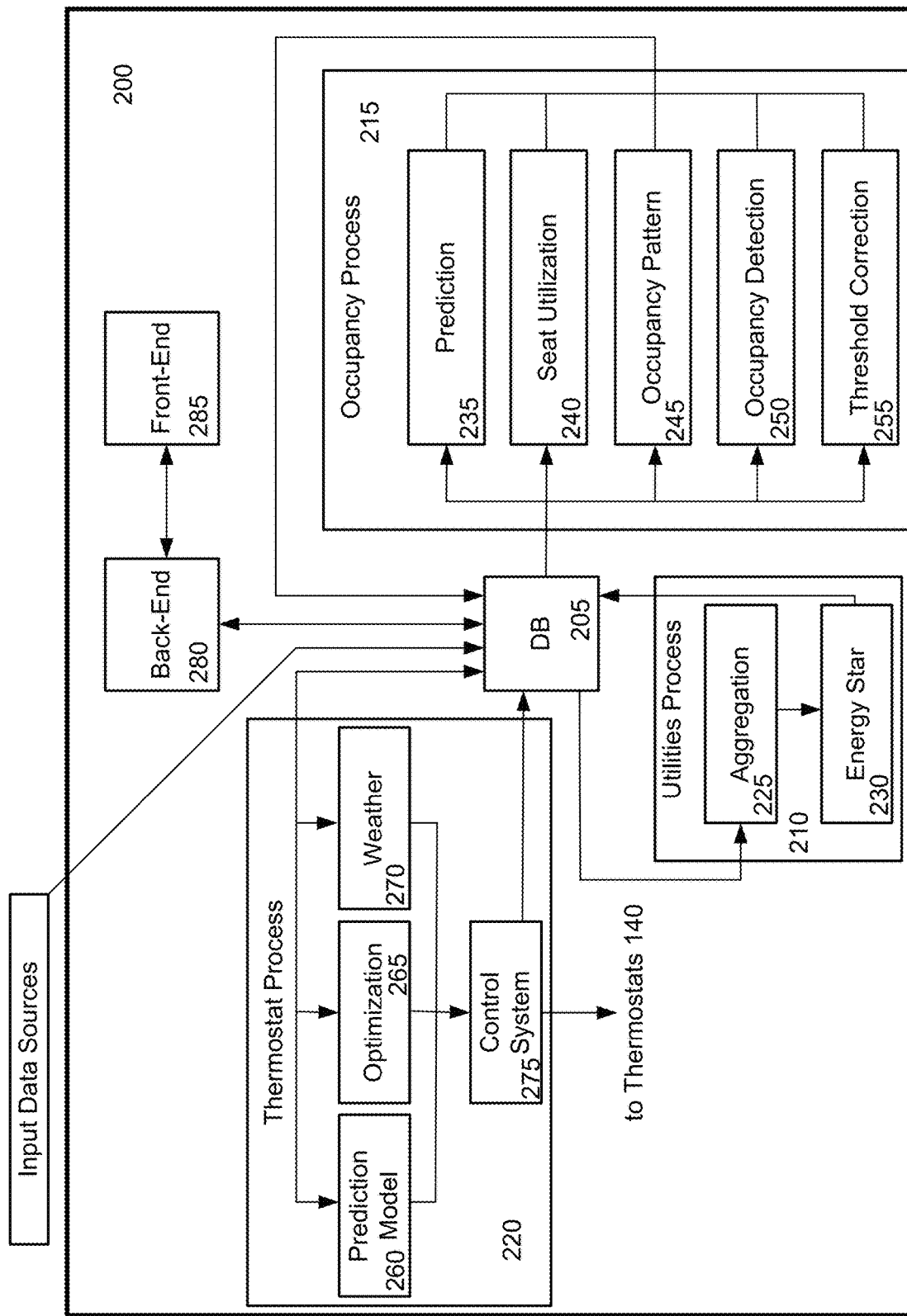
FIG. 2 shows a schematic illustration of exemplary logic for implementing various methods of the present invention.

FIG. 2 is a schematic representation of exemplary logic 200 for implementing various methods of the present invention. Logic 200 can be implemented in a cloud-based service 180 or a network server, in various embodiments. Logic 200 includes a database 205 such as a cloud-based database like MongoDB. The database 205 is continuously updated with data received from input data sources such as sensors in the building 100, people in the building 100, and $3^{rd}$ party sources 190. The database 205 is also accessed and updated by a plurality of sub-logics such as an Utilities Process 210, an Occupancy Process 215, and a Thermostat Process 220 that also returns control signals for the thermostats 140.

In various embodiments, the database 205 is schema less, such as a MongoDB database hosted on Amazon Web Services platform via mLab. MongoDB is a document database in which one collection holds different documents. Number of fields, content and size of the document can differ from one document to another.

The Utilities Process 210 makes use of historical utilities usage and billing records. An example of a $3^{rd}$ party data source 190 that provides such data is Cass Utility Information Systems, Inc. In some embodiments, the $3^{rd}$ party data source 190 pushes the data, such as monthly, which is received through an API and stored in the database 205. The Utilities Process 210 includes an aggregation module 225 that aggregates the raw data from one or more $3^{rd}$ party data sources 190 where the raw data can include one or more of electric, gas, water, steam and so forth. Aggregation module 225 organizes the data, such as by the month, and uploads that data to a resource such as Energy Star 230 (portfolio-manager.energystar.gov) in order to obtain a score (1-100) for the building 100. That score is then stored to the database 205. More particularly, aggregation module 225 preprocesses the utility information for the building 100 to remove errors such as double counting and then transmits that information to the Energy Star 230 portfolio manager via its API. The portfolio manager assigns a rating to the building 100 based on energy use. Buildings with ratings above 75 are deemed energy efficient and hence eligible for certification. These ratings can also be used to identify buildings that are least energy efficient among several properties as possible candidates for energy efficiency projects.

The Occupancy Process 215 employs machine learning/artificial intelligence to model occupancy within the building 100 on the level of individual seats, or workstations, based on information stored in the database 205. Revised occupancy models and occupancy determinations for the seats of the building 100 that are made by the Occupancy Process 215 are stored in the database 205. Every electricity monitor 150 is identified by a unique identifier, and over time the Occupancy Process 215 can learn which unique identifiers are associated with electric devices 160 such as appliances that do not correlate well with occupancy, and which unique identifiers are associated with electric devices 160 such as a personal computer that, when in use, indicate a person is present. For example, over time, the accumulated power usage data associated with some unique identifiers will match a pattern representative of a refrigerator, or a security camera. Accumulated power usage data associated with other unique identifiers will match a pattern representative of occupancy, that is, a pattern that correlates to use by a person at a seat or workstation, like a pattern of daily use of a personal computer over certain spans of the day.

Unique identifiers that are found to match a pattern of occupancy are considered to be "seats" that may be modeled for predictive purposes as being occupied at certain times of the day and unoccupied otherwise. Predictive models may be updated based on actual data for seats received from electricity monitors 150. Unique identifiers that correspond to seats are stored in the database 205 and the set can be revised as outlets are repurposed. Along with the unique identifiers, other information can be stored for each seat, including location within the building, such as by floor and zone, whether it is used by one person or several, and so forth.

Occupancy Process 215 includes a number of modules, and in the illustrated embodiment, includes a prediction model 235, a seat utilization module 240, an occupancy patterns model 245, an occupancy detection module 250, and a threshold correction module 255. Prediction model 235 runs on a periodic basis, such as daily, to predict the occupancy and pattern of each seat for the next day, for example, the next 12 working hours, the span of 06:00 AM-06:00 PM. Prediction model 235 employs an occupancy model for the building to make the predictions. The prediction model 235 can revise the occupancy model according to new seat occupancy information made available by the occupancy detection module 250, discussed below.

Seat utilization module 240 also runs on a periodic basis, such as hourly, to analyze the utilization of each seat according to the amount of time that power is used and categorize the seat into one of several categories, such as 0-2 hrs, 2-4 hrs, 4-6 hrs, 6-8 hrs and over 8 hrs. Occupancy patterns model 245 also runs on a periodic basis, such as hourly, to analyze the occupancy patterns and classify the seats into categories according to the amount of power used for each seat. Occupancy patterns model 245 employs pattern recognition algorithms, in various embodiments. An exemplary scheme of three classifications can comprise patterns such as arrives around 10:00 AM and leaves around 4:00 PM, arrives around 8:30 AM and leaves around 6:00 PM, and arrives around 9:30 AM and leaves around 5:00 PM. Each of these modules can make their determinations from data received from electricity monitors 150 that are recognized as seats.

Occupancy detection module 250 can run in real time, or at short intervals, such as every two minutes, to detect the occupancy of each seat. Occupancy detection module 250 can make the determination of occupancy from data received from electricity monitors 150 recognized as seats, as well as other sensors, if present. In some embodiments, recent data within the stored power usage data for the seat is compared to a power usage threshold for that seat to determine whether the seat is occupied. Recent data can simply be the most recent datum received for that unique identifier, such as within the last two minutes. Recent data can also encompass a time average over spans such as 4, 6, 8, 10, 12, 16, or 20 minutes so that a momentary dip below the threshold does not mark the seat as unoccupied.

In some embodiments, Occupancy Process 215 fills in gaps in historical data using the prediction model 235 and writes the filled data to the database 205, to be used in further analytics and visualizations. The need to fill in such gaps can arise, for instance, in real time environments when a sensor node connection becomes disconnected or crashes or otherwise fails to transmit a reading. One simple algorithm that can be implemented is to fill any missing value with the last recorded value. It is a reasonable assumption that the state did not change in consecutive readings for a sampling period of 2 minutes.

Threshold correction module 255 runs on a periodic basis, such as twice weekly, to reevaluate the appropriate threshold to use for determining the occupancy state of each seat based on power use at each seat. This can be achieved, for example through statistical control and models that consider the prior several weeks of usage for a seat, filters out vampire loads, detects and removes outliers, and sets a baseline threshold. Outliers, usages of short duration, can be caused by eddy currents, for example. Threshold values are then used to determine the occupancy at each seat by the occupancy detection module 250. In some embodiments, where input data sources include people in the building 100, the threshold correction module 255 can optionally receive manual inputs of occupancy, such as when a person logs into their workstation or a supervisor uploads a headcount. In these instances, the module 255 can correlate power use to actual occupancy to determine a threshold for a given seat.

Thermostat Process 220 provides the thermostat control and acquires from the database such inputs as weather, both current and forecast, as well as an occupancy model produced by the Occupancy Process 215, and any reports of building conditions from users. Thermostat Process 220 employs machine learning/artificial intelligence, in various embodiments. In the illustrated embodiments, Thermostat Process 220 includes a predictive model 260, an optimization module 265, and a weather module 270. These three modules feed into a control system 275 that runs, for instance, on an hourly basis to set optimal heat and cool ranges for each thermostat 140. In various embodiments, Thermostat Process 220 allows users to set thermostats 140 in automatic mode (temperature setting determined by the Thermostat Process 220) or manual (temperature set by the user).

The predictive model 260 includes the occupancy model from the Occupancy Process 215 and provides both current occupancy, the distribution of occupants through the building 100, and a prediction of future occupancy, such as for the next hour. Optimization module 265 takes into account user-generated reports of being too hot or cold as well as analytics of building conditions that may impact heating/cooling of the building, for example, if heat isolation is poor, like when a window is open, malfunctioning thermostats 140, snow covering windows, etc. The weather module 270 takes into account present and forecast conditions including temperature, wind, humidity, and up to about 30 other factors.

The logic 200 also includes a back-end 280 and a front-end 285. Back-end 280 provides API endpoints for visualization by months, weeks, days, hours, floors, regions within the building, etc. to the front-end 285. In some embodiments, back-end 280 employs Django, a high-level Python Web framework. The front-end 285 uses Angular, in some embodiments, a TypeScript-based open-source front-end web application platform. Front-end 285 aggregates, slices and dices data to allow for visualization (i.e. occupation by week day, by hour, etc.). In some embodiments, a person can view building occupancy at the level of individual seats through such visualization, and can manually input corrections, such as when a seat is incorrectly determined to be occupied. This input can be used by the threshold correction module 255, for example.

Logic 200 can also include a space utilization process. Like the illustrated processes, the space utilization process uses stored data accessible in the database 205 including predictive models, together with occupancy readings, to recommend in real-time the optimum seats to occupy. The space utilization process employs operational rules to determine workstation utilization and dynamically assign seats to optimize occupancy levels, such as by floor or zone.

Several embodiments are specifically illustrated and/or described herein. However, it will be appreciated that modifications and variations are covered by the above teachings and within the scope of the appended claims without departing from the spirit and intended scope thereof. The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The term "logic" as used herein is limited to hardware, firmware and/or software stored on a non-transient computer readable medium in combination with a processor configured to implement the instructions. As used herein, a non-transient computer readable medium expressly excludes paper. The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

The invention claimed is:
1. A method comprising:
receiving, from a plurality of electricity monitors distributed within a building, each electricity monitor including a unique identifier, power usage data associated with the unique identifier for each electricity monitor;
for each unique identifier, storing in a database the received power usage data in association with that unique identifier;
for each unique identifier, determining whether the stored power usage data matches a pattern for occupancy, wherein the pattern for occupancy is a pattern of power use that correlates with use by a person residing in a seat;
for each unique identifier with power usage data matching the pattern for occupancy, determining whether recent data within the stored power usage data exceeds a power usage threshold; and
counting as an occupied seat every unique identifier having power usage data matching the pattern for occupancy and having recent data within the power usage data exceeding the power usage threshold to determine a number of occupied seats.
2. The method of claim 1 further comprising, for each unique identifier, storing in the database, in association with that unique identifier, a location of the electricity monitor within the building.

3. The method of claim 1 further comprising for each unique identifier, filling in missing values in the power usage data stored in the database.

4. The method of claim 1 further comprising revising a power usage threshold for a unique identifier.

5. The method of claim 1 further comprising adjusting a setting of a thermostat within the building based on a change in the number of occupied seats.

6. The method of claim 1 further comprising updating an occupancy model for the building based on a comparison of the occupied seats to seats predicted by the occupancy model.

7. The method of claim 1 further comprising categorizing each seat according to the amount of time that power is used.

8. The method of claim 1 further comprising dynamically assigning unoccupied seats.

9. The method of claim 1 further comprising receiving and aggregating data from a $3^{rd}$ party source located outside of the building.

\* \* \* \* \*